US010507841B1

(12) United States Patent
Singh et al.

(10) Patent No.: US 10,507,841 B1
(45) Date of Patent: Dec. 17, 2019

(54) SYSTEM AND METHOD FOR SENSOR DIAGNOSTICS

(71) Applicant: GM GLOBAL TECHNOLOGY OPERATIONS LLC, Detroit, MI (US)

(72) Inventors: Gurhari Singh, Toronto (CA); Andrew M. Zettel, Port Moody (CA); Crystal Nassouri, West Bloomfield, MI (US); Henry R. Wright, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/255,153

(22) Filed: Jan. 23, 2019

(51) Int. Cl.
| | | |
|---|---|---|
| *B60W 50/04* | (2006.01) |
| *G05D 1/00* | (2006.01) |
| *G05D 1/02* | (2006.01) |
| *G07C 5/08* | (2006.01) |
| *B60W 30/18* | (2012.01) |
| *B60W 50/00* | (2006.01) |

(52) U.S. Cl.
CPC .......... *B60W 50/04* (2013.01); *B60W 30/18* (2013.01); *G05D 1/0088* (2013.01); *G05D 1/0231* (2013.01); *G07C 5/0808* (2013.01); *B60W 2050/0083* (2013.01); *B60W 2400/00* (2013.01); *B60W 2420/42* (2013.01); *G05D 2201/0213* (2013.01)

(58) Field of Classification Search
CPC .............. B60W 50/04; B60W 40/072; B60W 2050/0083; G05D 1/0088; G05D 1/0231; G07C 5/0808
USPC .................................................. 701/23, 29.1
See application file for complete search history.

(56) References Cited

U.S. PATENT DOCUMENTS

2007/0260383 A1\* 11/2007 Sundaram ......... B60W 50/0205
701/70
2016/0178381 A1\* 6/2016 Lynch .................... G01C 21/30
701/23

\* cited by examiner

*Primary Examiner* — Isaac G Smith

(57) ABSTRACT

A method of controlling a ground vehicle includes providing the vehicle with a first sensor configured to detect a vehicle position, a second sensor configured to detect a driven path of the vehicle, and a controller. The method also includes obtaining, via the first sensor, a plurality of vehicle position coordinates during a time interval of a drive cycle, and calculating, via the controller, a first path curvature parameter based on the plurality of vehicle position coordinates. The method additionally includes obtaining, via the second sensor, a second path curvature parameter based on the driven path during the time interval. The method further includes comparing, via the controller, the first path curvature parameter to the second path curvature parameter, and in response to a difference between the second path curvature and the first path curvature exceeding a threshold, automatically operating the controller according to a diagnostic mode.

20 Claims, 3 Drawing Sheets

SYSTEM AND METHOD FOR SENSOR DIAGNOSTICS

INTRODUCTION

The present disclosure relates to vehicles having sensor suites, e.g. those controlled by automated driving systems configured to automatically control vehicle steering without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. As automation levels increase, sensor precision and confidence requirements likewise increase.

SUMMARY

A method of controlling a ground vehicle according to the present disclosure includes providing the vehicle with a first sensor configured to detect a vehicle position, a second sensor configured to detect a driven path of the vehicle, and a controller in communication with the first sensor and the second sensor. The controller is selectively operable according to a diagnostic mode. The method also includes obtaining, via the first sensor, a plurality of vehicle position coordinates during a time interval of a drive cycle, and calculating, via the controller, a first path curvature parameter based on the plurality of vehicle position coordinates. The method additionally includes obtaining, via the second sensor, a second path curvature parameter based on the driven path during the time interval. The method further includes comparing, via the controller, the first path curvature parameter to the second path curvature parameter, and in response to a difference between the second path curvature and the first path curvature exceeding a threshold, automatically operating the controller according to the diagnostic mode.

In an exemplary embodiment, the method additionally includes providing the vehicle with a third sensor configured to detect the driven path of the vehicle. The controller being in communication with the third sensor. Such embodiments additionally include obtaining, via the third sensor, a third path curvature parameter based on the driven path during the time interval. Such embodiments further include comparing, via the controller, the third path curvature parameter to the first path curvature parameter and the second path curvature parameter, and in response to a difference between the third path curvature and the first and second path curvatures exceeding a threshold, automatically operating the controller according to the diagnostic mode. The diagnostic mode may include disabling a function associated with the third sensor.

In an exemplary embodiment, the second sensor includes a camera.

In an exemplary embodiment, the diagnostic mode includes communicating a backup control request. The backup control request includes a request for backup control of the vehicle, and discontinuing autonomous control of the vehicle.

In an exemplary embodiment, the diagnostic mode includes communicating a diagnostic signal to a remote device.

In an exemplary embodiment, the diagnostic mode includes controlling the first sensor or the second sensor to perform an automatic sensor realignment.

In an exemplary embodiment, the first curvature parameter is obtained from an nth order polynomial fit to the plurality of vehicle position coordinates.

In an exemplary embodiment, the second curvature parameter is obtained from an nth order polynomial fit to the driven path.

A ground vehicle according to the present disclosure includes a first sensor configured to detect a vehicle position, a second sensor configured to detect a driven path of the vehicle, and a controller in communication with the first sensor and the second sensor. The controller is selectively operable according to a diagnostic mode. The controller is configured to obtain, via the first sensor, a plurality of vehicle position coordinates during a time interval of a drive cycle. The controller is also configured to calculate a first path curvature parameter based on the plurality of vehicle position coordinates. The controller is additionally configured to obtain, via the second sensor, a second path curvature parameter based on the driven path during the time interval. The controller is further configured to compare the first path curvature parameter to the second path curvature parameter, and in response to a difference between the second path curvature and the first path curvature exceeding a threshold, to automatically operate according to the diagnostic mode.

In an exemplary embodiment, the ground vehicle additionally includes a third sensor configured to detect the driven path of the vehicle. The controller is in communication with the third sensor. The controller is additionally configured to obtain, via the third sensor, a third path curvature parameter based on the driven path during the time interval. The controller is further configured to compare the third path curvature parameter to the first path curvature parameter and the second path curvature parameter, and in response to a difference between the third path curvature and the first and second path curvatures exceeding a threshold, to automatically operate according to the diagnostic mode. In such embodiments, the diagnostic mode may include disabling a function associated with the third sensor.

In an exemplary embodiment, the second sensor comprises a camera.

In an exemplary embodiment, the diagnostic mode includes communicating a backup control request. The backup control request includes a request for backup control of the vehicle, and discontinuing autonomous control of the vehicle.

In an exemplary embodiment, the diagnostic mode includes communicating a diagnostic signal to a remote device.

In an exemplary embodiment, the diagnostic mode includes controlling the first sensor or the second sensor to perform an automatic sensor realignment.

In an exemplary embodiment, the first curvature parameter is obtained from an nth order polynomial fit to the plurality of vehicle position coordinates.

In an exemplary embodiment, the second curvature parameter is obtained from an nth order polynomial fit to the driven path.

A system for controlling a ground vehicle includes a remote communication center and a ground vehicle. The ground vehicle has a first sensor configured to detect a vehicle position, a second sensor configured to detect a driven path of the vehicle, a wireless communication system in communication with the remote communication center, and a controller in communication with the first sensor, the second sensor, and the wireless communication system. The controller is configured to obtain, via the first sensor, a plurality of vehicle position coordinates during a time interval of a drive cycle. The controller is also configured to calculate a first path curvature parameter based on the plurality of vehicle position coordinates. The controller is additionally configured to obtain, via the second sensor, a second path curvature parameter based on the driven path during the time interval. The controller is further configured to compare the first path curvature parameter to the second path curvature parameter, and in response to a difference between the second path curvature and the first path curvature exceeding a threshold, to automatically communicate a diagnostic signal to the remote communication center via the wireless communication system.

In an exemplary embodiment, the remote communication center is configured to associate the diagnostic signal with a geographic region and cluster the diagnostic signal with additional diagnostic signals associated with the geographic region.

Embodiments according to the present disclosure provide a number of advantages. For example, the present disclosure provides a system and method for automatically detecting a discrepancy between sensors on a vehicle, and for automatically taking appropriate corrective action in response to such a discrepancy.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
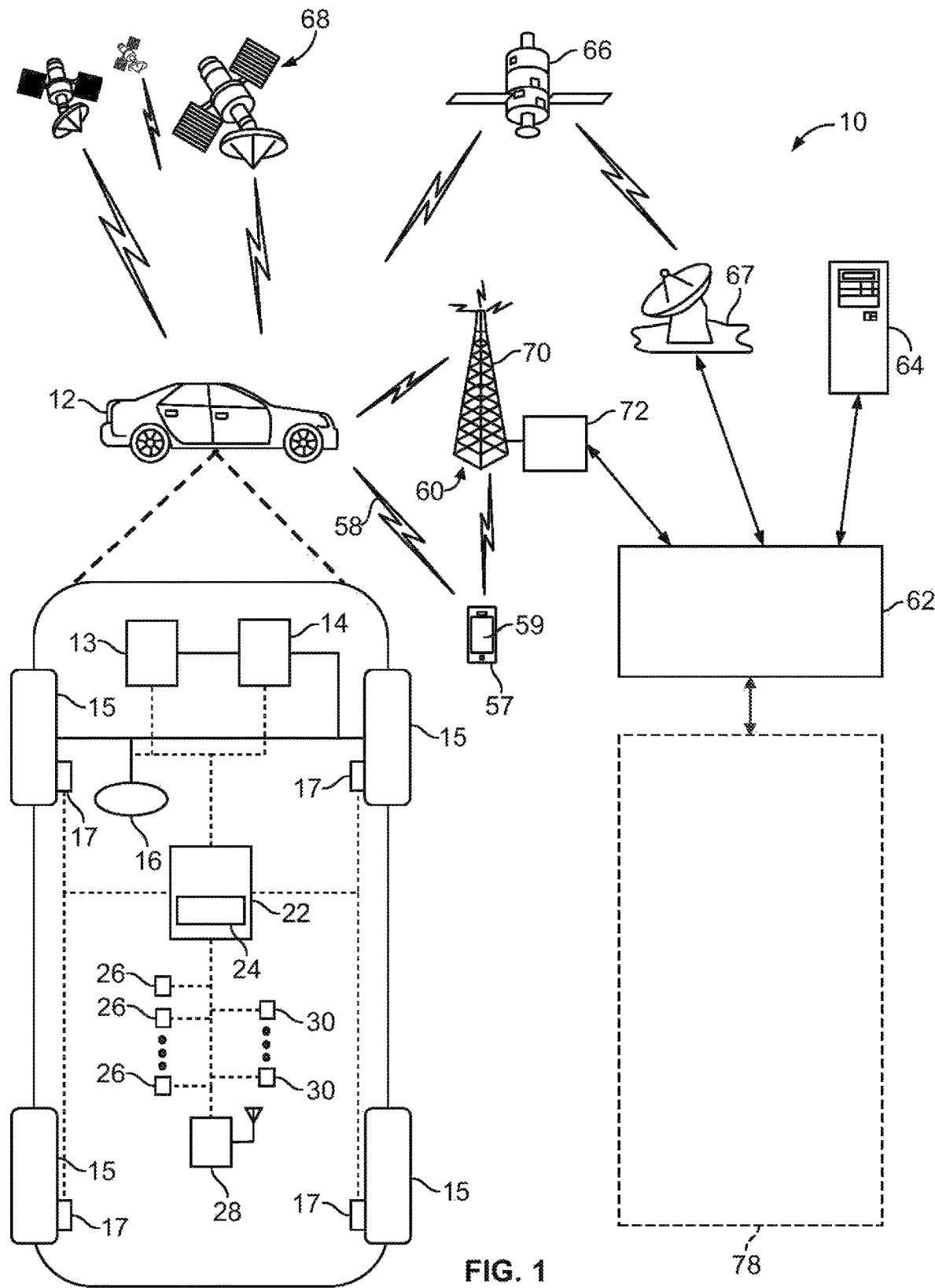
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The motor vehicle 12 may be referred to as a host vehicle. The communication and control system 10 for the host vehicle 12 generally includes one or more wireless carrier systems 60, a land communications network 62, a computer 64, a mobile device 57 such as a smart phone, and a remote access center 78.

The host vehicle 12, shown schematically in FIG. 1, is depicted in the illustrated embodiment as a passenger car, but it should be appreciated that any other vehicle including, but not limited to, motorcycles, trucks, sport utility vehicles (SUVs), recreational vehicles (RVs), work vehicles, marine vessels, aircraft, etc., can also be used. The host vehicle 12 includes a propulsion system 13, which may in various embodiments include an internal combustion engine, an electric machine such as a traction motor, and/or a fuel cell propulsion system.

The host vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The host vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The host vehicle 12 additionally includes a steering system 16. While depicted as including a steering wheel for illustrative purposes, in some embodiments contemplated within the scope of the present disclosure, the steering system 16 may not include a steering wheel.

The host vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 ("WiFi™") and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific (e.g. within defined geographic boundaries) performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

Other embodiments according to the present disclosure may be implemented in conjunction with so-called Level One, Level Two, or Level Three automation systems. A Level One system indicates "driver assistance", referring to the driving mode-specific execution by a driver assistance system of either steering or acceleration using information about the driving environment and with the expectation that the human driver performs all remaining aspects of the dynamic driving task. A Level Two system indicates "Partial Automation", referring to the driving mode-specific execution by one or more driver assistance systems of both steering and acceleration using information about the driving environment and with the expectation that the human driver performs all remaining aspects of the dynamic driving task. A Level Three system indicates "Conditional Automation", referring to the driving mode-specific performance by an automated driving system of all aspects of the dynamic driving task with the expectation that the human driver will respond appropriately to a request to intervene.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GNSS (global navigation satellite system, e.g. GPS and/or GLONASS), RADAR, LIDAR, optical cameras, thermal cameras, ultrasonic sensors, inertial measurement units (IMUs), wheel speed sensors, steering angle sensors, and/or additional sensors as appropriate.

FIG. 1 illustrates several networked devices that can communicate with the wireless communication system 28 of the host vehicle 12. One of the networked devices that can communicate with the host vehicle 12 via the wireless communication system 28 is the mobile device 57. The mobile device 57 can include computer processing capability, a transceiver capable of communicating signals 58 using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving signals from GPS satellites 68 and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The mobile device 57 may also include other sensors, including but not limited to, accelerometers capable of measuring motion of the mobile device 57 along six axes. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide unidirectional or bidirectional communication with the host vehicle 12. This can be done using one or more communication satellites 66 and an uplink transmitting station 67. Unidirectional communication can include, for example, satellite radio services, wherein programming content (news, music, etc.) is received by the transmitting station 67, packaged for upload, and then sent to the satellite 66, which broadcasts the programming to subscribers. Bidirectional communication can include, for example, satellite telephony services using the satellite 66 to relay telephone communications between the host vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the host vehicle 12 via the wireless communication system 28 and the wireless carrier

60. Other computers 64 can include, for example: a service center computer where diagnostic information and other vehicle data can be uploaded from the vehicle via the wireless communication system 28 or a third party repository to or from which vehicle data or other information is provided, whether by communicating with the host vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the host vehicle 12. The computer 64 may be in communication with at least one supplemental vehicle in addition to the host vehicle 12. The host vehicle 12 and any supplemental vehicles may be collectively referred to as a fleet. In an exemplary embodiment, the computer 64 is configured to store, e.g. in non-transient data memory, subscriber account information and/or vehicle information. The subscriber account information can include, but is not limited to, biometric data, password information, subscriber preferences, and learned behavioral patterns of users or occupants of vehicles in the fleet. The vehicle information can include, but is not limited to, vehicle attributes such as color, make, model, license plate number, notification light pattern, and/or frequency identifiers.

Figure 2:
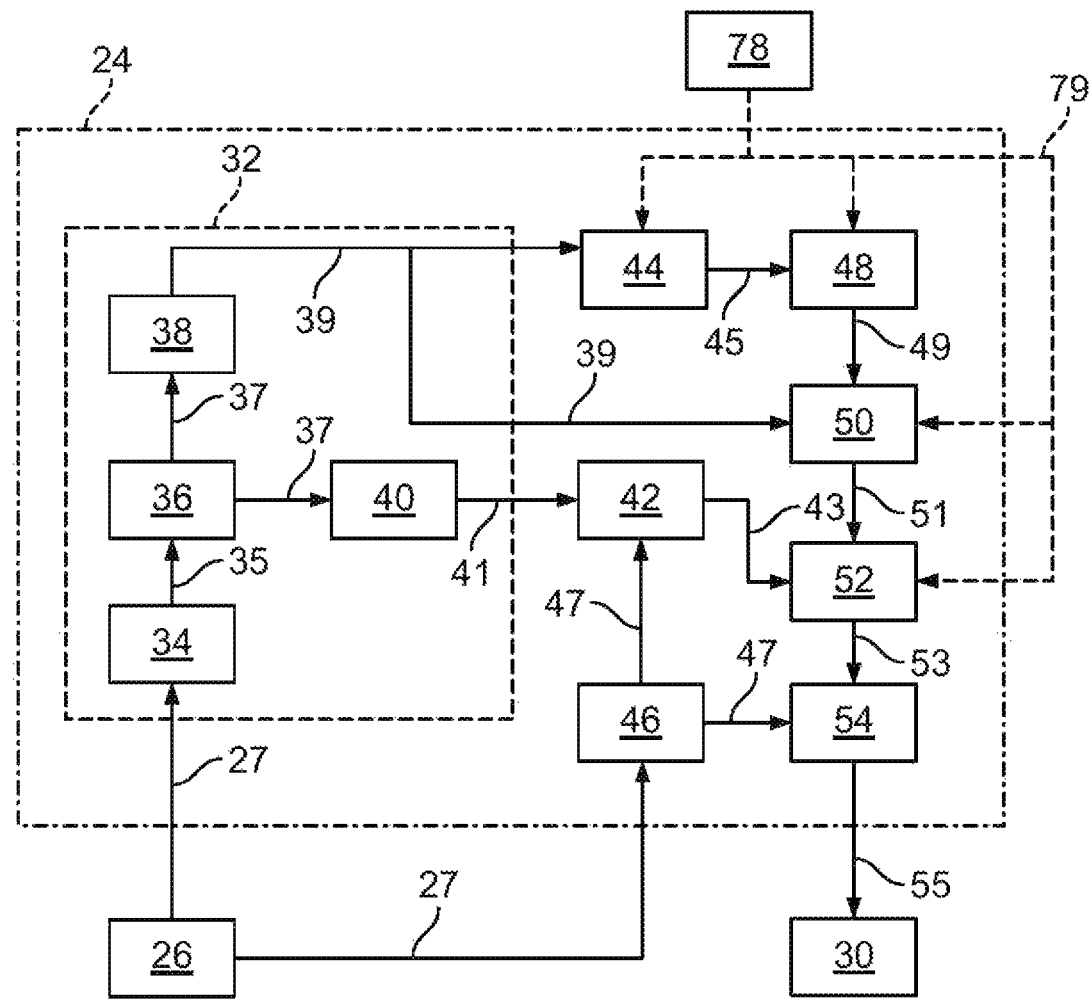
FIG. 2 is a schematic block diagram of an automated driving system (ADS) for a vehicle according to an embodiment of the present disclosure.

As shown in FIG. 2, the ADS 24 includes multiple distinct systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, RADAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light and sign classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation module 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of the host vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the host vehicle 12 during operation and mapping data "pushed" to the host vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the host vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Fidelity of sensor data is important in all vehicles, but particularly when the vehicle is under the control of the ADS 24, and thereby relying heavily upon sensor data for satisfactory operation. It is thereby desirable to ensure that the sensors 26 are providing accurate and consistent information to the controller 22.

Figure 3:
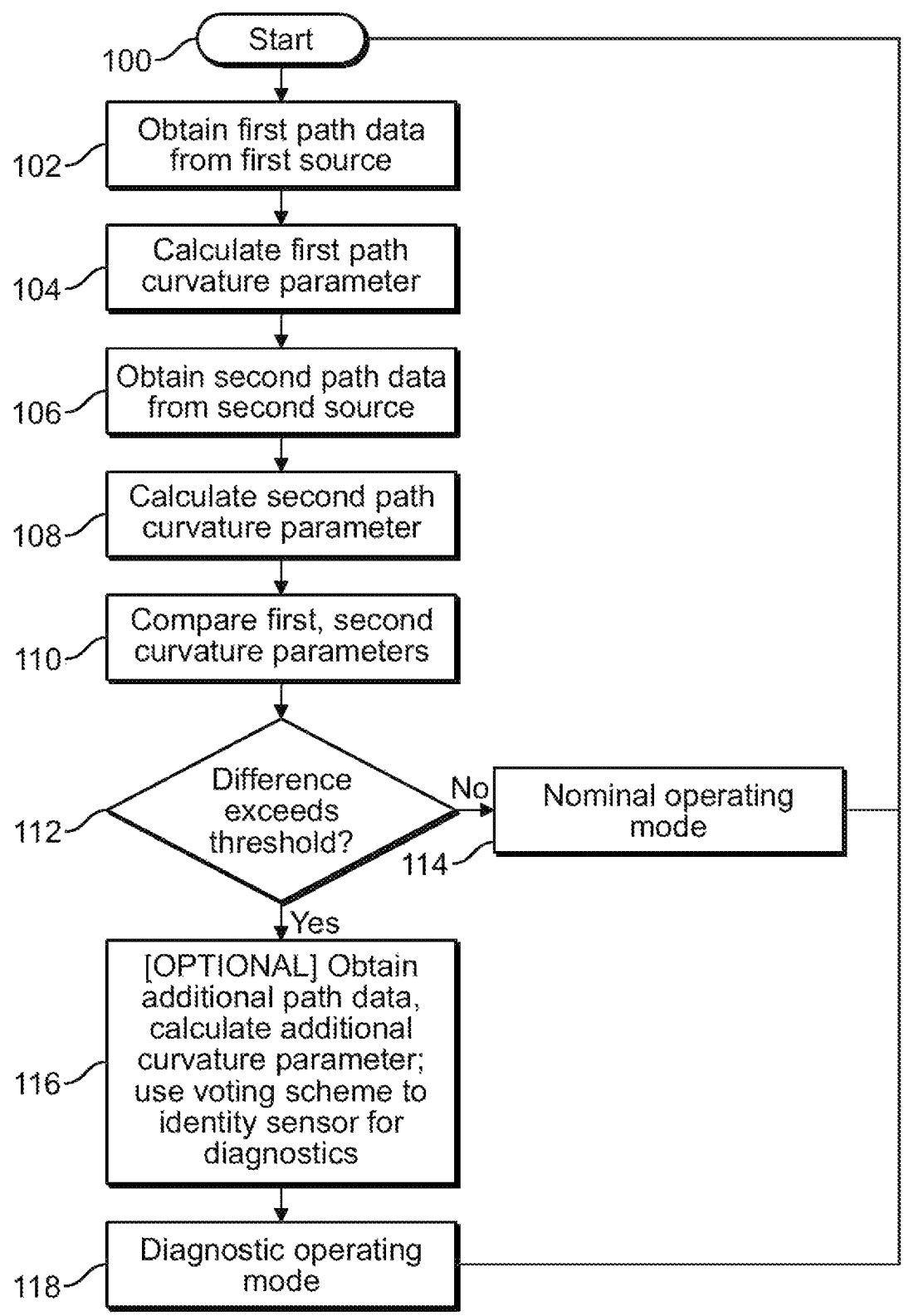
FIG. 3 is a flowchart representation of a method of controlling a vehicle according to an embodiment of the present disclosure.

Referring now to FIG. 3, a method of controlling a vehicle according to the present disclosure is illustrated in flowchart form. The algorithm begins at block 100.

First path data is obtained from a first source, as illustrated at block 102. In an exemplary embodiment, the first path data includes a plurality of vehicle position coordinates captured during a time interval of a drive cycle. In an exemplary embodiment, the first source is one of the sensors 26 which is arranged as a GNSS receiver. In such an embodiment, the vehicle position coordinates comprise a sequence of geoposition coordinates and associated timestamps for the coordinates. The plurality of vehicle position coordinates may be referred to as a "breadcrumb trail." However, in other embodiments, the first source may include other types of sensors, such as wheel speed sensors or other sensors capable of detecting path curvature of a driven path of the vehicle 12. Moreover, in some embodiments the first source may include a source of path data other than on-board sensors, e.g. stored map data, as will be discussed in further detail below.

A first path curvature parameter is calculated based on the first path data, as illustrated at block 104. In an exemplary embodiment, the calculation is performed via the controller 22. The first curvature parameter may be obtained using any suitable curve fit technique. As a non-limiting example, an nth-order polynomial, e.g. $3^{rd}$-order, may be obtained using a least squares method relative to the path data.

Second path data is obtained from a second source, as illustrated at block 106. In an exemplary embodiment, the second path data includes data indicative of a path followed by the vehicle 12 during the time interval of the drive cycle corresponding to that of the first path data. In an exemplary embodiment, the second source is one of the sensors 26, e.g. different from the sensor 26 defining the first source. As a nonlimiting example, the second source may be a video camera, e.g. a front-facing camera configured to observe lane markings or other indicia of path curvature. As a second nonlimiting example, the second source may be an inertial measurement unit (IMU). In such an embodiment, measured data from the IMU may be used in conjunction with dead reckoning techniques to estimate a curvature of a path of the vehicle. As a third nonlimiting example, the second source may be any additional sensor capable of detecting path curvature, including, but not limited to, LiDAR or RADAR.

A second path curvature parameter is obtained based on the second path data, as illustrated at block 108. The second path curvature parameter is obtained based on signals from a second sensor 26. In a first exemplary embodiment, the second sensor 26 comprises a camera module configured to observe lane markings or other indicia of path curvature. The second curvature parameter may be obtained using any suitable curve fit technique which enables comparison between the second and first path curvature parameters, and may be a similar curve fit technique or different curve fit technique to that used in obtaining the first curvature parameter.

While not described in detail, the first path data, first curvature parameter, second path data, and second curvature parameter may be collected and stored in any fashion suitable for subsequent evaluation by an automated process. As an example, the first path data and second path data may comprise a predefined number of data points stored in a computer-readable memory buffer. The first path curvature parameter and second path curvature parameter may be calculated based on the data points in the memory buffer and subsequently stored in a computer-readable storage medium.

The first path curvature parameter is compared to the second path curvature parameter, as illustrated at block 110. In an exemplary embodiment, the comparison is performed via the controller 22.

A determination is made of whether a difference between the second path curvature parameter and the first path curvature parameter exceeds a threshold, as illustrated at operation 112. In an exemplary embodiment, the threshold is a calibrated value selected by the manufacturer of the vehicle 12. The threshold may be a constant value, or may be a variable based on parameters including, but not limited to, vehicle speed. The threshold is selected to detect a drift in measurements between the sensors, while permitting a minimal amount of disagreement to account for small measurement errors.

In response to a negative determination to operation 112, i.e. the difference does not exceed the threshold, then the vehicle 12 is controlled according to a nominal operating mode, e.g. according to the default behavior of the ADS 24. Control then returns to block 102. The vehicle thereby continues to operate according to the nominal mode unless and until the difference exceeds the threshold.

In response to the determination of operation 112 being positive, then the vehicle is automatically controlled according to a diagnostic operating mode, as illustrated at block 118. The diagnostic operating mode may include one or more of the following exemplary modes, other suitable diagnostic operating modes, or any combination thereof as appropriate.

In a first exemplary embodiment, the diagnostic operating mode includes discontinuing automatic control of the vehicle 12 by the ADS 24 and reverting to a backup control scheme, e.g. manual control by an occupant of the vehicle 12 or remote control by a user external to the vehicle 12. In such an embodiment, the controller 22 may communicate a backup control request to the occupant or external user, e.g. via any suitable HMI, prior to the discontinuation of automatic control.

In a second exemplary embodiment, the diagnostic mode includes communicating information relating to the discrepancy to a remote device, e.g. the computer 64, via the wireless communication system 28, or storing information relating to the discrepancy in non-transient computer-readable storage media on-board the vehicle 12. The information may include identifiers for the first source and second source, e.g. type of sensor, a geolocation where the discrepancy was identified, and any other pertinent information. Such information may thereafter be analyzed to improve future performance of the vehicle and/or improve road markings or other infrastructure, e.g. by clustering multiple incidents occurring at a common geolocation to identify patterns therein.

In a third exemplary embodiment, the diagnostic operating mode includes reverting to an alternate source of data, e.g. a redundant sensor 26 if available. In such an embodiment, any vehicle functions which utilize the data source(s) associated with the discrepancy may instead be controlled according to alternate data sources.

In a fourth exemplary embodiment, the diagnostic mode includes an alternate control method, e.g. limiting driving speed, or automatically performing a maneuver to remove the vehicle 12 from a driving surface, such as by pulling off to the shoulder of a road. The vehicle may thereby be automatically removed from service until suitable remedial measures may be performed. Other alternative control methods may likewise be used, as appropriate.

In a fifth exemplary embodiment, the diagnostic mode includes commanding a self-realignment of one or both sensors 26, if available.

Subsequent activation of the diagnostic mode, control returns to block 102.

In some embodiments, one or more additional curvature parameters are calculated based on one or more additional sets of path data obtained from one or more additional sources, e.g. additional sensors 26, as illustrated at block 118, prior to activation of the diagnostic operating mode at block 116. Such sensors may be of a like kind as the second sensor 26, e.g. redundant sensors, or of a different kind from the second sensor 26. In such embodiments, the one or more additional path curvature parameters may be compared to the first path curvature parameter and the second path curvature parameter. A voting scheme may then be used, e.g. by the controller 22, to identify which sensor(s) 26 differ from the consensus of the other sensors 26. In such an embodiment, the diagnostic operating mode of block 118 may be selected to isolate the outlying sensor(s) 26 and discontinue functions associated with such sensor(s) 26. As an example, if the voting scheme indicates that a forward-facing camera is providing curvature data which is an outlier from other data sources, then the diagnostic operating mode may include discontinuing functions associated with the forward-facing camera, e.g. automated lane-centering.

Variations on the above-described algorithm are, of course, possible. As a non-limiting example, the diagnostic mode may be engaged only upon multiple subsequent comparisons of first and second curvature parameters exceeding the threshold, thereby providing a hysteresis effect.

In another exemplary variation, the first source comprises map data, e.g. stored in a non-transient computer-readable storage medium, and the first path data comprises a vehicle path to be followed, e.g. obtained from the path planning module 50. In such an embodiment, vehicle sensors used as the second source or additional sources may be validated against upcoming road curvature data from the map data, thereby enabling earlier detection of discrepancies between the second source and the first source.

In yet another variation, the diagnostic mode may be disabled in certain geographic regions, e.g. those with inconsistent or missing road markings which could result in poor curvature measurement.

As may be seen, the present disclosure provides a system and method for automatically detecting a discrepancy between sensors on a vehicle, and for automatically taking appropriate corrective action in response to such a discrepancy.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a ground vehicle, comprising:
providing the vehicle with a first sensor configured to detect a vehicle position, a second sensor configured to detect a driven path of the vehicle, and a controller in communication with the first sensor and the second sensor, the controller being selectively operable according to a diagnostic mode;
obtaining, via the first sensor, a plurality of vehicle position coordinates during a time interval of a drive cycle;
calculating, via the controller, a first path curvature parameter based on the plurality of vehicle position coordinates;

obtaining, via the second sensor, a second path curvature parameter based on the driven path during the time interval;

comparing, via the controller, the first path curvature parameter to the second path curvature parameter; and in response to a difference between the second path curvature and the first path curvature exceeding a threshold, automatically operating the controller according to the diagnostic mode.

2. The method of claim 1, further comprising:

providing the vehicle with a third sensor configured to detect the driven path of the vehicle, the controller being in communication with the third sensor;

obtaining, via the third sensor, a third path curvature parameter based on the driven path during the time interval;

comparing, via the controller, the third path curvature parameter to the first path curvature parameter and the second path curvature parameter; and in response to a difference between the third path curvature and the first and second path curvatures exceeding a threshold, automatically operating the controller according to the diagnostic mode.

3. The method of claim 2, wherein the diagnostic mode comprises disabling a function associated with the third sensor.

4. The method of claim 1, wherein the second sensor comprises a camera.

5. The method of claim 1, wherein the diagnostic mode comprises communicating a backup control request, the backup control request comprising a request for backup control of the vehicle, and discontinuing autonomous control of the vehicle.

6. The method of claim 1, wherein the diagnostic mode comprises communicating a diagnostic signal to a remote device.

7. The method of claim 1, wherein the diagnostic mode comprises controlling the first sensor or the second sensor to perform an automatic sensor realignment.

8. The method of claim 1, wherein the first curvature parameter is obtained from an nth order polynomial fit to the plurality of vehicle position coordinates.

9. The method of claim 1, wherein the second curvature parameter is obtained from an nth order polynomial fit to the driven path.

10. A ground vehicle comprising:

a first sensor configured to detect a vehicle position;

a second sensor configured to detect a driven path of the vehicle; and a controller in communication with the first sensor and the second sensor, the controller being selectively operable according to a diagnostic mode, the controller being further configured to obtain, via the first sensor, a plurality of vehicle position coordinates during a time interval of a drive cycle, to calculate a first path curvature parameter based on the plurality of vehicle position coordinates, to obtain, via the second sensor, a second path curvature parameter based on the driven path during the time interval, to compare the first path curvature parameter to the second path curvature parameter; and in response to a difference between the second path curvature and the first path curvature exceeding a threshold, to automatically operate according to the diagnostic mode.

11. The ground vehicle of claim 10, further comprising a third sensor configured to detect the driven path of the vehicle, the controller being in communication with the third sensor, wherein the controller is further configured to obtain, via the third sensor, a third path curvature parameter based on the driven path during the time interval, to compare the third path curvature parameter to the first path curvature parameter and the second path curvature parameter, and in response to a difference between the third path curvature and the first and second path curvatures exceeding a threshold, to automatically operate according to the diagnostic mode.

12. The ground vehicle of claim 11, wherein the diagnostic mode comprises disabling a function associated with the third sensor.

13. The ground vehicle of claim 10, wherein the second sensor comprises a camera.

14. The ground vehicle of claim 10, wherein the diagnostic mode comprises communicating a backup control request, the backup control request comprising a request for backup control of the vehicle, and discontinuing autonomous control of the vehicle.

15. The ground vehicle of claim 10, wherein the diagnostic mode comprises communicating a diagnostic signal to a remote device.

16. The ground vehicle of claim 10, wherein the diagnostic mode comprises controlling the first sensor or the second sensor to perform an automatic sensor realignment.

17. The ground vehicle of claim 10, wherein the first curvature parameter is obtained from an nth order polynomial fit to the plurality of vehicle position coordinates.

18. The ground vehicle of claim 10, wherein the second curvature parameter is obtained from an nth order polynomial fit to the driven path.

19. A system for controlling a ground vehicle comprising:

a remote communication center;

a ground vehicle having a first sensor configured to detect a vehicle position, a second sensor configured to detect a driven path of the vehicle, a wireless communication system in communication with the remote communication center, and a controller in communication with the first sensor, the second sensor, and the wireless communication system, the controller being configured to obtain, via the first sensor, a plurality of vehicle position coordinates during a time interval of a drive cycle, to calculate a first path curvature parameter based on the plurality of vehicle position coordinates, to obtain, via the second sensor, a second path curvature parameter based on the driven path during the time interval, to compare the first path curvature parameter to the second path curvature parameter; and in response to a difference between the second path curvature and the first path curvature exceeding a threshold, to automatically communicate a diagnostic signal to the remote communication center via the wireless communication system.

20. The system of claim 19, wherein the remote communication center is configured to associate the diagnostic signal with a geographic region and cluster the diagnostic signal with additional diagnostic signals associated with the geographic region.

* * * * *